United States Patent
Morse

[15] 3,656,674
[45] Apr. 18, 1972

[54] WEB TENSION ISOLATOR OR AMPLIFIER FOR WEB HANDLING APPARATUS

[72] Inventor: John E. Morse, Rochester, N.Y.
[73] Assignee: Eastman Kodak Company, Rochester, N.Y.
[22] Filed: Mar. 18, 1970
[21] Appl. No.: 20,612

[52] U.S. Cl. ................................226/25, 226/37, 226/35, 226/195, 226/177
[51] Int. Cl. .................................................G11b 15/43
[58] Field of Search.....................226/25, 44, 176, 177, 187, 226/195, 35, 37; 74/213

[56] References Cited

UNITED STATES PATENTS

| | | |
|---|---|---|
| 3,279,665 | 10/1966 | Badgett..................................226/25 |
| 3,478,945 | 11/1969 | Cooke...............................226/187 X |
| 1,561,190 | 11/1925 | Seely.......................................74/213 |
| 3,380,678 | 4/1968 | Feasey et al......................226/25 UX |
| 3,534,894 | 10/1970 | Bretti..............................226/188 X |

*Primary Examiner*—Allen N. Knowles
*Attorney*—Robert W. Hampton and G. Herman Childress

[57] ABSTRACT

A web tension isolator or amplifier includes a rotatable pulley engageable with a driver pulley in response to tension forces in a web that is wrapped on the driven pulley. The mechanism maintains the film tension ratio (i.e., the ratio of the tensions in the web portions on the two sides of the driven pulley) substantially constant regardless of the magnitude of the web tension. The mechanism automatically and quickly adjusts the web tension for any variations in the tensions of the web portions at either side of the driver pulley. The mechanism can be used (for example) in a motion picture projector between the film gate and a supply reel and/or a take-up reel.

8 Claims, 9 Drawing Figures

PATENTED APR 18 1972
3,656,674
SHEET 1 OF 4
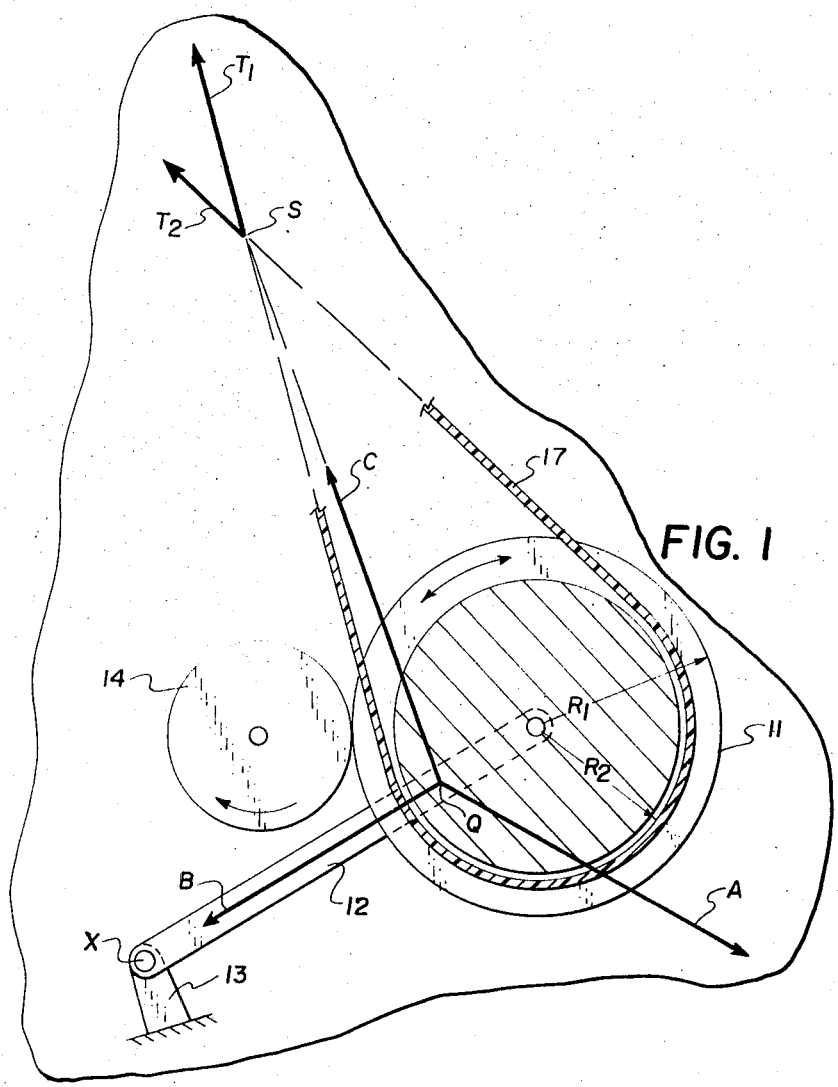
FIG. 1
FIG. 2
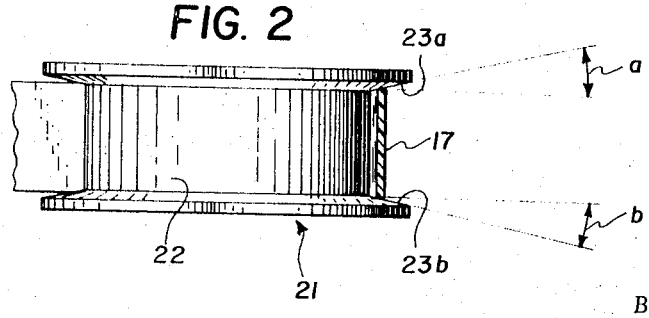
JOHN E. MORSE
INVENTOR.
BY D. Herman Childers
Robert W Hampton
ATTORNEYS

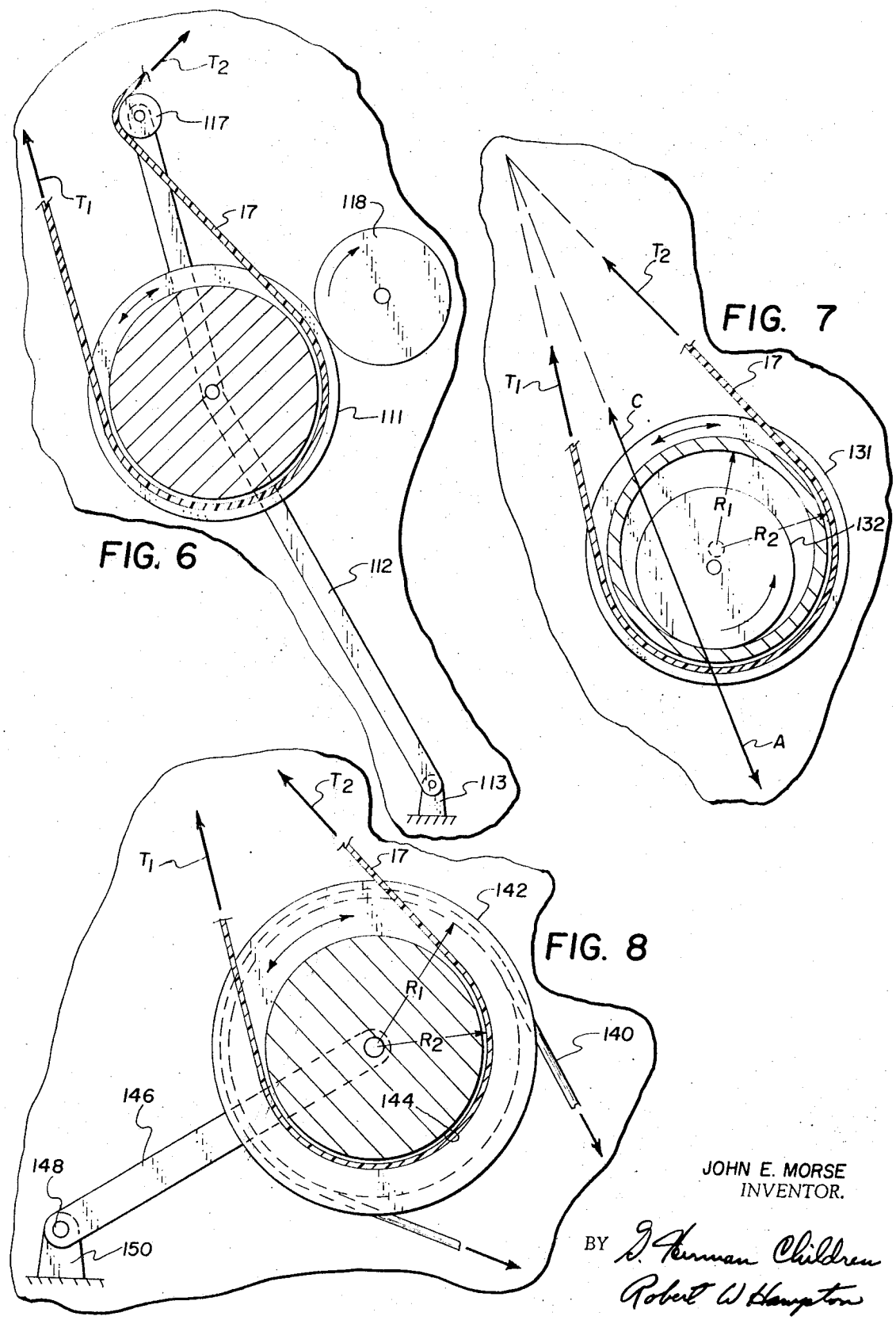

3,656,674

WEB TENSION ISOLATOR OR AMPLIFIER FOR WEB HANDLING APPARATUS

BACKGROUND OF THE INVENTION

This invention relates to web handling apparatus and, more particularly, to a web tension isolator or amplifier for use in a web handling apparatus.

In advancing or feeding of webs in various apparatus, one problem encountered is the control of tension in the web at various points between a web supply and a web take-up. This control is desirable in feeding of various types of webs or web-like members, such as film, magnetic tapes, belts, chains and the like. However, this problem is particularly troublesome in connection with a web advancing mechanism that intermittently advances a thin, flexible web, e.g., a motion picture projector, wherein it is important for projection of a steady image that the film while in a projector film gate be held substantially stationary. In order for the film to be stationary in the gate it should be substantially isolated from those film tensions and tension fluctuations produced by normal operation of the projector. Motion picture projectors produce undesirable film tensions on film at the film gate in various ways. For example, the film take-up reel is usually constantly driven in a take-up direction through a friction or so-called tendency drive even when the film is being held stationary in the gate. The film supply reel also may be driven in a take-up direction by a friction or tendency drive even when film is being forcibly withdrawn from the supply reel by operation of the claw. Even if the supply reel is free-wheeling, tension fluctuations are produced by the mass of the reel and film wound thereon opposing advancement of the film by the pull-down claw. Tension fluctuations attributable to the mass of the reel and film are particularly acute when large film rolls (e.g., 400 feet of film) are to be handled by the projector. Thus a strip of film being projected by a motion picture projector is constantly subjected to tension forces that tend to produce undesirable unsteady projected images due to slight film movement at the gate when the film should be held stationary. In addition, these tension forces adversely affect film life. Various means have been proposed in the past for avoiding these problems but, for one reason or another, most of the prior arrangements have failed to adequately or completely solve the problem.

SUMMARY OF THE INVENTION

Accordingly, it is an object of this invention to improve web handling apparatus by controlling the tension forces in portions of the web.

Another object of the invention is to provide a web tension amplifier capable of maintaining substantially constant a predetermined or design tension force in a web strand.

A more specific object of the invention is to isolate film at a particular portion of a film advancing mechanism from tension forces acting on the film in other portions of the film advancing mechanism.

A still further object of the invention is to isolate film while in the film gate of a motion picture projector from tension forces produced at the supply and take-up reels, and at other portions of the mechanism.

In accordance with the present invention, a length of web material is wrapped at least partially around a rotatable pulley or the like, and fluctuations in tension in the web strands at either side of the pulley couple and uncouple the pulley from a driving connection with a driver member. The geometry and arrangement of the parts is such that the extent of the drive applied to the web supporting member is a function of tension forces in the web portions adjacent the driven pulley so that the tension forces in such web portions can be accurately controlled.

In accordance with specific illustrative embodiments of the invention, a freely rotatable pulley is mounted on a pivoted arm. A driver pulley is mounted for rotation about a fixed axis and the surface of the first pulley is brought into contact with the driver pulley by tension forces in portions of a strip of film wrapped partially around the first pulley. The forces applied and the mechanical geometry of the mechanism are such that the film tension ratio, i.e. the ratio of the tensions in the film on the respective two sides of the pulley, is maintained substantially constant regardless of the magnitude of the film tension or the driver pulley velocity. Two of the mechanisms can be provided in a single motion picture projector and symmetrically positioned one on each side of the film gate to isolate film in the film gate from film tension fluctuations.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a schematic view of a web tension isolator or amplifier in accordance with a specific illustrative embodiment of the invention;

FIG. 2 is an elevation of a pulley of one type suitable for use with the present invention;

FIG. 6 is a view of a modification somewhat similar to FIG. 5 but utilizing a differently shaped pivoted arm;

FIG. 7 is a schematic view of still another modification wherein the pivoted arm has been eliminated; and FIG. 8 is a view of an embodiment wherein a drive belt is used instead of a driver pulley or disk.

DESCRIPTION OF THE PREFERRED EMBODIMENTS

Figure 3:
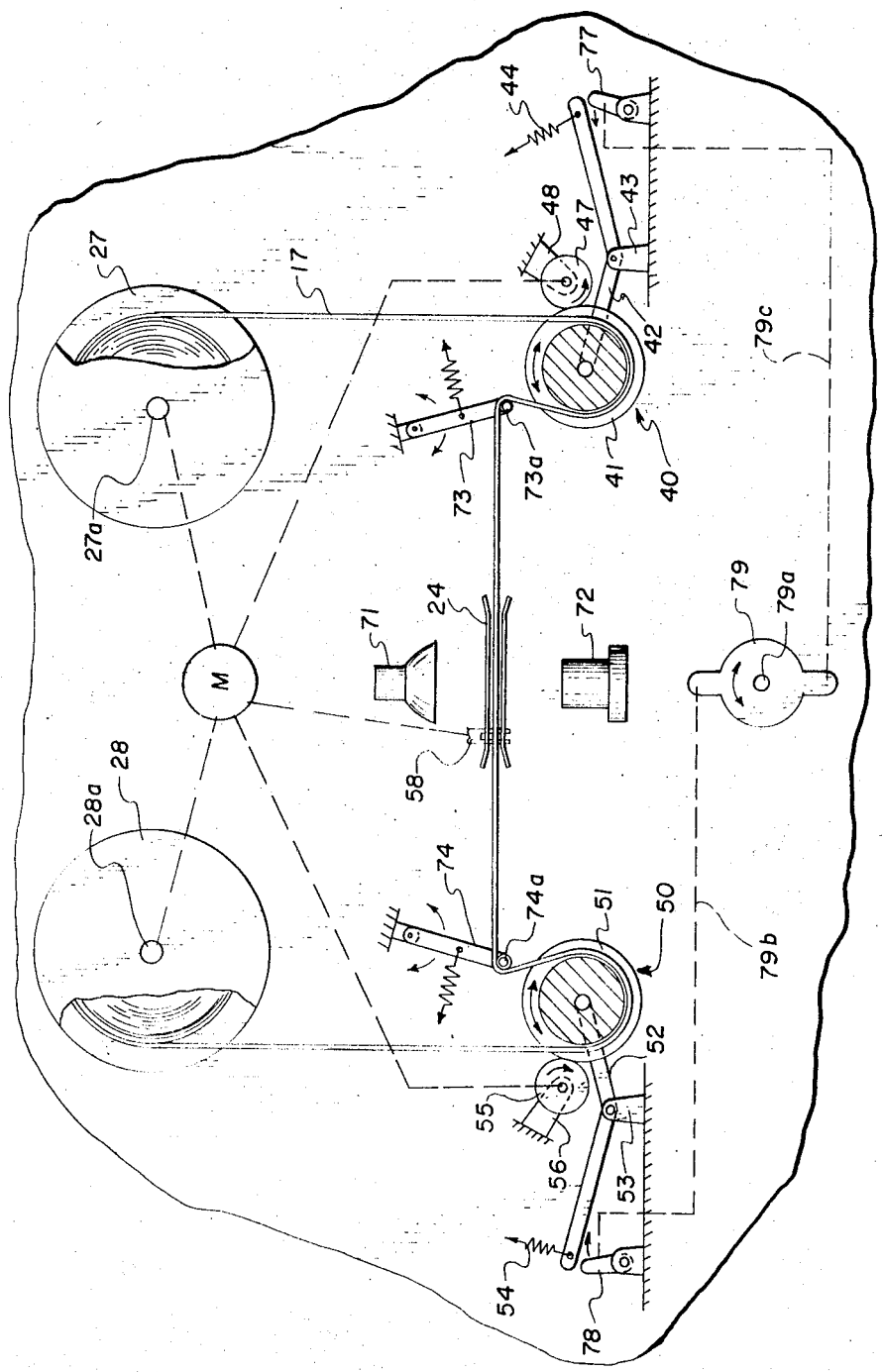
FIG. 3 is a schematic view of certain portions of a motion picture projector including tension isolators or amplifiers in accordance with the present invention.

Because web handling apparatus are well known, the present description will be directed in particular to elements forming part of, or cooperating more directly with, the present invention, elements not specifically shown or described herein being understood to be selectable from those known in the art.

The terms "tension isolator" and "tension amplifier" are used interchangeably in this description in view of the dual by related functions achieved by the mechanisms described. Referring now to the drawings and first particularly to FIG. 1, a tension isolator or amplifier in accordance with one specific illustrative embodiment of the invention comprises a freely rotatable pulley 11 mounted at one end of an arm 12. A web is engageable with an angular portion of pulley 11 as explained later. The arm is mounted at its other end on a support or base 13 for pivotal movement of the arm and pulley 11 in both directions about an axis X. A driver pulley 14 is continuously rotated about a fixed axis by suitable power means (not shown in FIG. 1). The pulleys 11 and 14 are mounted with respect to each other so that the outer surface of pulley 11 at a radius $R_1$ can be brought into engagement with the surface of pulley 14 to permit pulley 11 to be driven by pulley 14. Driver pulley 14 is preferably driven at a speed which is sufficiently high so that slippage continuously occurs between the surfaces of the driver and the driven pulleys when they are in contact. The driving torque of pulley 11 depends (in part) on the force urging pulley 11 against pulley 14 and this, in turn, is a function of the tension in the web portion trained around pulley 11. The pulley 11 has a second surface located at a radius $R_2$. The web 17 to be advanced, herein described by way of example as a length of motion picture film, is wrapped or looped around the pulley 11 and engages a circumferential portion of the pulley at radius $R_2$. The film should not slip with respect to the pulley 11. Film slip will not occur provided the film tension ratio required for slip always remains greater than the tension ratio produced by the pulley system.

Under the influence of the forces or vectors $T_1$ and $T_2$ acting on the high tension side and low tension side, respectively, of the film 17, pivoted arm 12 may be swung about its axis until the surface of pulley 11 at radius $R_1$ is brought into contact with the driving surface of pulley 14. The contact force between the two pulleys can increase in response to increases in vectors $T_1$ and/or $T_2$ until equilibrium is reached between the forces acting on the mechanism. In FIG. 1 the forces acting on pulley 11 when the system is in equilibrium are as represented by vectors A, B and C. Vector A is the resultant of the radial and tangential forces imposed on pulley 11 by pulley 14. The direction of vector A, referred to herein as the driver line of action, is determined by the coefficient of sliding friction $\mu$ between the driver pulley 14 and the driven surface of pulley 11 at the point at which pulley 11 contacts pulley 14. Vector B represents the force exerted on pulley 11 by the pivoted arm 12, which force acts along the common center line or axis of the pulley and the arm when the geometrical relation between the parts is as shown in FIG. 1. Vector C represents the resultant line of action of the total forces (the tension forces $T_1$ and $T_2$) exerted by film 17 on pulley 11. From the foregoing it will be apparent that an increase in the film tension (vector C) produces an increase in the driving force (vector A) applied to pulley 11 by pulley 14, and that such increase must be balanced by vectors A and B for the system to remain in equilibrium.

The lines of action of vectors A and B intersect at a point Q. The location of point Q is a function of the mechanical geometry of the mechanism and the driver coefficient of friction only. When pulley 11 is in rotational equilibrium, the line of action of vector C also passes through the point Q. Vectors $T_1$ and $T_2$ intersect at a point S. Accordingly, the total film force line of action (vector C) also passes through point S.

From the preceding discussion, it follows that the location and direction of the total film force line of action (vector C) is established solely by the geometry of the mechanism and the driver coefficient of friction. The ratio $T_1/T_2$ comprises the film tension ratio or "gain" of the mechanism. Since the direction of vector C is established, the ratio $T_1/T_2$ also is established for a given position of the two film strands or portions at opposite sides of pulley 11.

When pulley 11 is in translational equilibrium, the A and B forces adjust themselves so that vectors A, B and C add vectorially to zero. Thus, any increase in film tension (vector C) increases the vector forces designated A and B but does not change the $T_1/T_2$ ratio. This tension ratio remains constant regardless of the magnitude of the film tension or speed of pulley rotation as long as the coefficient of sliding friction between pulleys 11 and 14 does not change. Also, a change in the direction of the line of action of any of vectors A, B and C can be compensated for by changes in the other vector(s) to provide an equilibrium condition.

In general the tension ratio $T_1/T_2$ or "gain" of a tension isolator or amplifier of this invention is determined by:
 a. The coefficient of sliding friction $\mu$;
 b. The ratio $R_1/R_2$
 c. The angle formed by a line from axis X to the center of pulley 11 and a line through the point of contact between pulleys 11 and 14 and the center of the pulley 11; and
 d. The location of the film wrap arc, i.e., the location of that portion of the pulley 11 at radius $R_2$ that is contacted by film 17.

By various arrangements and combinations of the basic elements discussed above, the operating characteristics of the isolator or amplifier of this invention may be varied.

As previously mentioned, during operation the web or film 17 should not slip with respect to the driven pulley 11. This no-slip condition is easily achieved in a number of different ways. For example, a V-groove type pulley generally designated 21 (FIG. 2) may be used as the driven pulley. As shown in FIG. 2, the pulley may have a generally cylindrical surface 22 that comprises a root support. The support 22 is positioned between two spaced and oppositely tapered frustoconical surfaces 23a and 23b. These surfaces are contacted by the side edges of the film throughout the extent of the wrap angle of the film about the driven pulley. Surfaces 23a and 23b are inclined at equal angles a and b, and these angles are preferably sufficiently small so that no slippage will occur between the side edges of film 17 and the surfaces 23a and 23b contacted by the film. Ordinarily the root support 22 is not contacted by the film, but it is preferably closely adjacent to the inner surface of film 17 so that it can be contacted by the film in the event the film buckles inwardly, thereby eliminating excessive tensions that otherwise might be encountered above the normal operating range of the mechanism of the invention. Normally the diameter of portion 22 of the pulley is selected so that the clearance between portion 22 and the film is the minimum required to insure contact between the edges of the film and the tapered flanges or surfaces 23a and 23b. Since the film normally contacts the pulley 21 only along the side edges of the film, undesirable scratching and wear of the image areas of the film is avoided.

Various other means may be utilized for preventing slip between the driven pulley and the film 17. For example, when perforated film is being handled then the driven member 11 can be a sprocket having teeth adapted to enter the film perforations. For either perforated film or unperforated film pulley 11 may be provided with a high friction surface or face. For example, a coating of rubber or other elastomeric material may be provided on the surface of the pulley contacted by the film. Of course, when film or similar webs are to be handled by the mechanism, surfaces contacted by such webs should not be unduly abrasive. Other constructions of the driven member may be used depending upon the particular application of the tension isolator or amplifier application, the nature of the web or other material being handled, etc.

FIG. 3 illustrates schematically a motion picture projector comprising a film gate 24 located along a film path between a roll of film on a film supply reel 27 and a take-up device or reel 28. The projector has two substantially identical film tension isolators or amplifiers 40 and 50 of the type described hereinbefore arranged symmetrically on opposite sides of gate 24. Each tension isolator has its low tension side toward film gate 24 and its respective high tension side toward supply reel 27 and take-up reel 28, respectively.

The tension isolators are the same basic mechanisms and have the same basic operating theory as previously described in connection with FIGS. 1 and 2. The supply amplifier or isolator 40 shown at the right in FIG. 3 comprises a rotatable pulley 41 mounted for free rotation in both forward or reverse directions on an arm 42 which is pivotally supported on base 43. Arm 42 extends beyond its pivotal mounting on base 43, and the extension is engaged by a tension spring 44. A driving roller or pulley 47 is rotatably supported on a fixed support or base 48 and is continuously rotated in the direction indicated by suitable power means, such as a motor M, coupled to pulley 47. Spring 44 is preferably a weak spring and it biases pulley 41 away from pulley 47.

The take-up isolator or amplifier 50 shown at the left comprises a rotatable pulley 51 mounted for rotation in both directions on an arm 52 which is pivotally mounted on base 53. Pulleys 41 and 51 can be constructed in the manner shown in FIG. 2 for pulley 21. An extension of arm 52 is engaged by a weak biasing tension spring 54 that urges pulley 51 away from a driver roller or pulley 55. Pulley 55 is rotatably supported on a fixed base 56 and is continuously rotated in the direction indicated by suitable power means such as motor M. Drivers 47 and 55 are both drivers at speeds that insure slippage between the drivers and their respective driven pulleys 41 and 51, and each driver is driven in a direction for feeding film toward the gate. Film 17 is wrapped partially around pulleys 41 and 51. There should be no slippage between the film and pulleys 41, 51.

A film claw 58 comprises part of a conventional intermittent drive mechanism for advancing film 17 through film gate 24 one frame at a time. In the usual manner light from a light source 71 is directed through an image frame on the film when the frame is properly located in film gate 24, and then to a lens assembly 72 for projection of an image on a suitable screen (not shown).

During advancement of film from reel 27 to reel 28, take-up reel 28 is driven in a take-up direction by a so-called "tendency driver," that is, the reel is driven through a friction clutch or the like at a rate higher than the rate that film is delivered to the reel so that a "pull" is constantly maintained on the film. The clutching mechanism included in the drive assembly permits the drive to be constantly applied to the reel even when no film is being taken up by reel 28. Similarly, supply reel 27 may be tendency driven in a film take-up direction during unwinding of film from the reel. A spindle suitable for use with supply reel 27 is disclosed in U.S. Pat. No. 3,468,498 issued Sept. 23, 1969 in the name of L. J. Bunting. Reels 27, 28 may be driven by spindles 27a, 28a, respectively, that are coupled to motor M, as shown diagrammatically in FIG. 3.

A pair of lightly biased spring arms 73 and 74 can be provided at the low tension sides of the film tension isolators between the film gate 24 and driven pulleys 41 and 51, respectively. The spring arms are each pivotally mounted on a stationary portion of the projector for pivotal movement back and forth in the manner indicated by the arrows in FIG. 3. Each arm has a finger portion shown at 73a and 74a, respectively, which engages and supports a portion of the film strip between the respective driven pulley and the film gate. The arms are spring biased away from the gate as illustrated diagrammatically so that a small tension or force is exerted on the film. This tension is inversely related to the size of the film loop produced by the arms. Preferably, the spring force acting on each arm has a natural frequency appreciably higher than the maximum pull-down frequency or rate of claw 58 so that the finger portion of each arm remains in contact with the film at all times. The spring force acting on arms 73, 74 is preferably obtained by making these arms of a spring material; however, separate spring members can be used if desired.

During operation of the projector for feeding film from the supply reel 27 to the take-up reel 28, claw 58 effects intermittent motion of the film through the film gate 24. As a length of film is pulled from the supply loop of film around finger 73a and added to the take-up loop around finger 74a, the film loop supported by arm 73 becomes smaller and the film loop supported by the arm 74 becomes larger. Arms 73 and 74 are both deflected to the left (as viewed in FIG. 3) in response to the changes in the size of the film loops engaged by these arms. Film advancement therefor increases the force on the film between reel 27 and gate 24 and correspondingly decreases the film tension in the loop between gate 24 and reel 28. The tension isolators are effective to maintain a constant film tension ratio ($T_1/T_2$) of 10 to 1, for example, in the film loops around pulleys 41 and 51. Thus as the film tension in the loop of the supply amplifier increases, driving torque on pulley 41 increases as the increased film tension forces pulley 41 against drive pulley 47 with a greater force and thereby increases the effectiveness of the drive on pulley 41 from driver 47. The film is driven toward the gate and into the loop around arm 73 until the tension in that loop returns to the design or equilibrium value. When such equilibrium condition is reached, driver pulley 47 is ineffective to rotate pulley 41. Conversely, the film tension in the loop of the take-up tension isolator or amplifier first decreases due to the length of film fed toward pulley 51 by claw 58, and driving torque on pulley 51 is decreased as pressure between rollers 51 and 55 is decreased, thus permitting take-up reel 28 to pull film from the loop and restore the design or equilibrium film tension in the portion of the film around pulley 51, thereby maintaining the ratio $T_1/T_2$ constant. The above cycle of operation is repeated each time film is advanced toward the take-up reel.

The moment of inertia of each pulley 41, 51 and the compliance of the associated spring arm 73 or 74 constitute a mechanical filter that effectively isolates the reels 27 and 28 from the energy pulses generated in the film by the pull-down claw. Also, reel load fluctuations are isolated from film at the gate 24 by this filter mechanism. As a result, film transport at the supply and take-up reels is very smooth and at an essentially uniform speed. Also, tension transients originating at the reels are highly attenuated at the film gate, thereby providing a steadier projected image and increasing film life.

It will be noted that the overall arrangement of the projector parts controlling film handling along the film path is fully symmetrical, and that each tension isolator tends to drive film toward the film gate. Thus forward and reverse projection of film is basically the same although, of course, in opposite directions. The two tension isolators or amplifiers are fully symmetrical and the action of each is basically the same regardless of the direction of film movement. Thus reels 27 and 28 have been arbitrarily designated as supply and take-up reels, respectively.

As previously noted, arm 42 may be biased counterclockwise by spring 44 and arm 52 may be biased clockwise by spring 54. The biasing force of each spring is relatively light, preferably being just enough to move the arm and disengage the supported pulley from the associated driver pulley at times when the reel film tension is extremely low. At such times as pulley 51 or pulley 41 is so disengaged from its associated driver, it then acts simply as a freely rotatable idler pulley. By suitable location of the pulleys 41 and 51 the force of gravity may be used to effect the biasing function of springs 44 and 54.

Means may be provided for declutching or disengaging one or both of the pulleys 41 and 51 from their respective driver pulleys. This may be desirable during rewind (for example) so that one or both of these pulleys act as free idlers. As shown in FIG. 3, this may be accomplished by providing clutch levers 77 and 78 that can be swung in the directions indicated to move arms 42 and 52 in directions that cause the respective driven pulleys supported by the arms to be disengaged from the pulleys 47 and 55. If desired, one pulley can be declutched while the other pulley is driven in the normal way. Thus only pulley 41 need be declutched to produce automatic rewinding of film onto reel 27 without further clutching of either reel 27 or 28. With pulley 41 acting as an idler, the full tension produced by reel 27 acts to the right on film at the gate. However, pulley 51 still being engaged causes only one tenth (for example) of the tension produced by reel 28 to act toward the left on the film at the gate. This difference in film tension causes the film to accelerate in a direction towards reel 27. This acceleration will continue until the motor drive speed of reel 27 or driver 55 is attained. The film can be brought to a gentle stop by reingagement of pulley 41 with driver 47 which restores the tension balance. Correspondingly, pulley 51 may be disengaged from driver 55 which will produce the same rewind action but in the opposite direction. It is understood that when rewinding or slowing the film at high speeds, the gate pressure pad, claw and any other film restraining devices are normally retracted to allow unimpeded motion of the film. The described mechanism therefore can be seen to provide a very simple means for control of all modes of film motion at high and low speeds in either direction.

By way of further example, both clutch levers may be moved simultaneously by means of a control lever 79 pivotal about an axis 79a and connected to both clutch levers by coupling means illustrated diagrammatically in FIG. 3 at 79b and 79c in which case reels 27 and 28 may be suitably clutched for high speed film motion in either direction.

Figure 4:
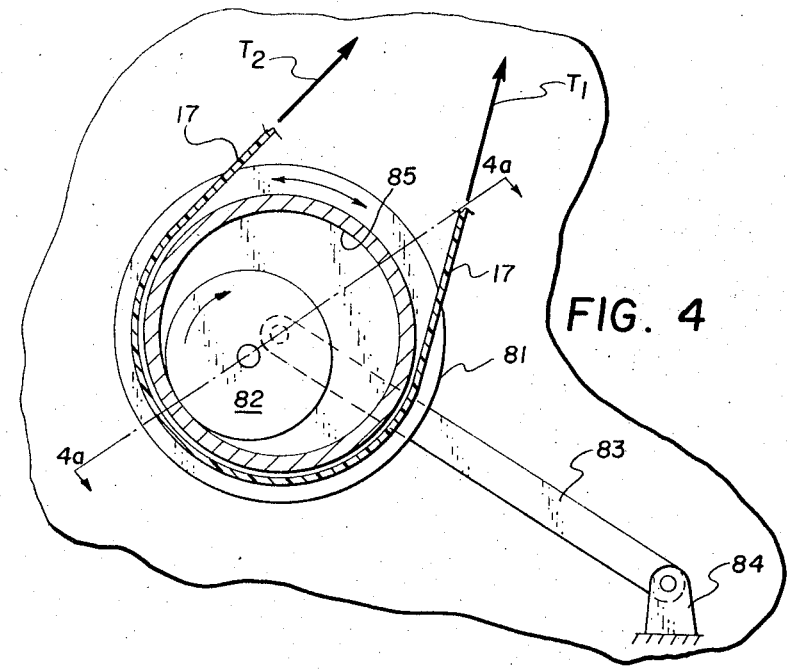
FIG. 4 is a schematic view of a modification of the isolator of FIG. 1 wherein an internal friction disk driver is utilized.
Figure 4A:
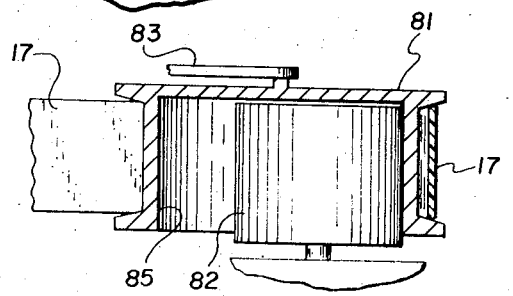
FIG. 4a is a section taken along line 4a–4a in FIG. 4.

FIGS. 4–7 illustrate embodiments of tension isolators that are basically similar in construction and theory of operation to the FIG. 1 embodiment previously described. In the embodiment shown in FIGS. 4 and 4a the external driver pulley 14 of FIG. 1 is omitted and a pulley 81 is driven by an internal friction disk driver or pulley 82. Pulley 82 is engageable with a generally cylindrical inner surface 85 that opens to at least one end of pulley 81. The diameter of surface 85 is substantially larger than the diameter of pulley 82 so that pulley 81 is movable into and out of engagement with pulley 82. As before, pulley 81 is mounted on an arm 83 for rotation in both directions, and arm 83 is pivoted on a support or base 84. In this instance the film 17 is wrapped on the outer surface of the pulley 81, and suitable provision is made for a no-slip wrap. Driver or pulley 82 is mounted for rotation about a fixed axis and pulley 81 is brought into engagement with the driver disk in response to the tension in the external paths of film 17. The vectors and lines of action for the various forces involved can be plotted in the same manner described in connection with FIG. 1. The external configuration of pulley 81 may be the same as that described for pulley 21 (FIG. 2) and pulley 81 can be urged clockwise out of contact with driver 82 by the force of gravity or by spring means as described in connection with FIG. 3.

Figure 5:
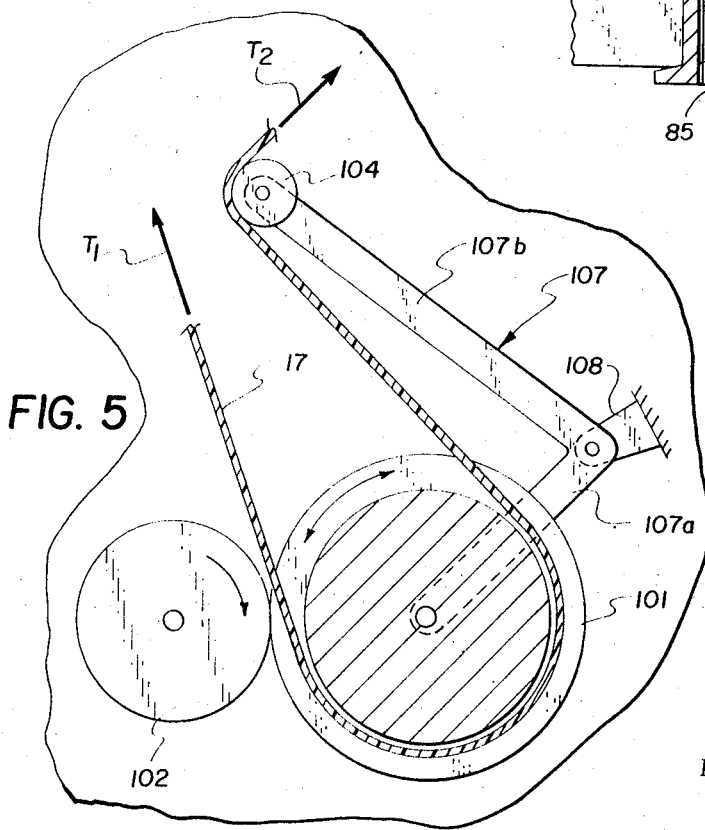
FIG. 5 is a schematic view of a modification of the isolator of FIG. 1 wherein the arm for the pulley is utilized to impart additional torque and increase the overall gain of the system.

In the embodiment shown in FIG. 5 a pulley 101 (which may be similar to pulley 21) is driven by driver pulley 102 in a manner generally similar to that described in the embodiment of FIG. 1. In this case, however, pulley 101 is mounted for rotation in both directions on one end of the shorter portion 107a of an L-shaped arm or bell crank 107. An idler roller 104 is mounted on the end of the longer portion 107b of the arm. The film 17 is wrapped partially around roller 104 and roller 101. Arm 107 is pivoted on a support or base 108 at the intersection of arm portions 107a and 107b.

When used in a motion picture projector such as shown in FIG. 3, arm 107 is arranged so that roller 104 is located between the film gate and pulley 101. The L-shaped arm and the film wrap around part of roller 104 in the manner shown provides a mechanical advantage that imparts an addition torque to the pivoted arm which increases the overall tension amplification or gain of the apparatus. Also, it reduces the effective inertia of the apparatus which raises the frequency response of the tension amplifier or isolator system. This method of increased amplification tends to render the apparatus less sensitive to changes in geometry and coefficient of friction although the enhanced frequency response amplifies the tension pulses produced during film pull-down.

FIG. 6 shows a further embodiment that is generally similar to that shown in FIG. 5. In FIG. 6, a pulley 111 is mounted on an arm 112 between the ends thereof for rotation in both directions. Arm 112 is pivotally mounted at one end on a support or base 113. Film 17 is partially wrapped around a freely rotatable roller 117 which is mounted at the free end of arm 112. Pulley 111 is driven by a driver pulley 118 in the manner previously described. In the FIG. 6 embodiment tension gain of the apparatus results only from the pivoted arm extension whereas in the embodiment of FIG. 5 the gain results both from the arm extension and from the film tension situation.

In the embodiments of FIGS. 5 and 6 just described, the arm portions supporting rollers 104 and 117 may be made of spring material. Also, in both of these embodiments the effective inertia and hence the system frequency response is a function of the length and position of the arm relative to other parts of the mechanism.

In the embodiment illustrated in FIG. 7, the pivotally mounted arm has been eliminated. A pulley 131 surrounds and is driven by an internal driver disk 132 in a manner similar to that discussed in connection with FIG. 4. Driver 132 is driven about a fixed axis, and suitable retainers (not shown) may be provided for limiting axial movement of pulley 131. Pulley 131 seeks a position of equilibrium wherein the line of action of the driver force on the pulley coincides with the line of action of the total film force on the pulley, and wherein the driver force vector A is equal and opposite to the total film force vector C. Since the location of the point of contact between driver disk 132 and pulley 131 is not rigidly fixed, the gain of the system depends upon the $R_1/R_2$ ratio and the value of the coefficient of friction.

In the embodiments described hereinbefore, a separate disk or pulley driver member has been disclosed for driving a pulley about which the film or other web is wrapped. FIG. 8 illustrates an embodiment wherein the driver member comprises a driver belt 140 which is trained about a driven pulley member 142 at a radius $R_1$. Belt 140 should have a slip type drive with respect to the pulley and the belt is driven at a speed that tends to drive the pulley faster than the maximum speed required for advancing the film about the pulley. The pulley is provided with a web supporting surface 144 at a radium $R_2$. The belt and web engaging portions of the pulley are offset axially from each other. Film 27 is wrapped about the pulley and engages surface 144. The pulley is mounted for rotation at the free end of an arm 146 and the other end of that arm is pivoted at 148 on a fixed support or base 150. In operation, the force of the engagement between the belt 140 and the pulley is determined by the tension in the film 17 and this, in turn, governs the driving force imparted by the belt to the pulley.

While the invention has been described as applied particularly in connection with film feeding mechanisms for motion picture projectors, it will be understood that the invention is applicable in connection with other types of webs, both perforated and non-perforated, belts of various types, chain, etc. The preceding discussion has been directed primarily to the use of the invention for maintaining a particularly low tension force ($T_2$); however, the invention is equally applicable to maintenance of a high tension force ($T_1$) as, for example, in winding a tight roll of web material. Irrespective of the application, simple and efficient means have been provided whereby the ratio of the tensions of the web portions on opposite sides of the driven pulley is maintained substantially constant by fully automatic means that are responsive to variations in tension in the web portions themselves. This tension ratio and the magnitude of the tension forces designated $T_1$ and $T_2$ may be varied over a wide range, as desired, by different geometrical arrangements and combinations of the basic elements, and by changing the coefficient of friction between the driver and driven pulley members. It is also noted that the absence of film lubricant insures a high coefficient of friction between the film and the driven pulley (which is desirable) while the absence of lubricant is normally undesirable with prior film handling devices.

The invention has been described in detail with particular reference to preferred embodiments thereof, but it will be understood that variations and modifications can be effected within the spirit and scope of the invention.

I claim:

1. In a motion picture projector having means for advancing film along a film path from a film supply past a film gate to a film take-up, the projector comprising two film tension isolators, each of said isolators comprising:
   a film support member having a film driving surface adapted to have trained there-around a loop of film, each isolator further comprising friction drive means for rotating said member, said isolators being symmetrically positioned along the film path at opposite sides of the film gate, and each of said isolators being effective to maintain a predetermined tension ratio in the portions of the film at opposite sides of the respective isolator whereby changes in tension forces acting on the film due to advancement of film through the film gate from the film supply toward the film take-up are compensated for by said isolators.

2. A projector as defined in claim 1 wherein each of said isolators further comprises means responsive to a variation in tension forces acting on the film for controlling coupling of said friction drive means to said film support member.

3. A projector as defined in claim 2 wherein each of said friction drive means comprises:
   a drive member mounted for rotation about a fixed axis; and
   means coupled to said drive member for constantly rotating said drive member about its axis.

4. A projector as defined in claim 3 wherein:
   said means for controlling coupling of said friction drive means to said film support member comprises an arm mounted for pivotal movement in an arc toward and away from said drive member about a fixed axis; and said film support member is carried by said arm for pivotal movement with said arm, whereby said film support member is movable into engagement with said drive member for rotation by said drive member.

5. A projector as defined in claim 1 wherein said friction drive means comprises an endless drive belt trained about a portion of said film support member.

6. A projector as defined in claim 3 wherein:
said film support member has an opening therein defining a substantially cylindrical surface; and
said drive member is positioned at least partially within said opening and engageable with said surface for driving said film support member.

7. A motion picture projector or the like for advancing film along a path from a film supply through a film gate to a film take-up, the projector comprising:
a rotatable member positioned along the film path and having a film driving surface around which a portion of said film can be partially wrapped so that film is advanced along the film path when said member is rotated;
drive means for rotating said member, thereby to advance film around said member, said means for effecting a driving connection comprises (1) a substantially L-shaped arm having a first arm portion on which said rotatable member is supported and a second arm portion, (2) a film guide member carried on said second arm portion for guiding film along the film path adjacent to said rotatable member, and (3) means mounting said arm for pivotal movement about an axis spaced from said rotatable member and extending through the arm substantially at the intersection of said arm portions for permitting movement of said rotatable member into and out of frictional driving engagement with said drive means.

8. A motion picture projector or the like for advancing film along a path from a film supply through a film gate to a film take-up, the projector comprising:
a rotatable member positioned along the film path and having a film driving surface around which a portion of said film can be partially wrapped so that film is advanced along the film path when said member is rotated;
drive means for rotating said member, thereby to advance film around said member, said means for effecting a driving connection comprising (1) an arm mounted for pivotal movement about one of its ends, (2) a film guide member mounted on the other end of said arm and adapted to guide film along the film path adjacent to said rotatable member, and (3) means for pivotally mounting said rotatable member on said arm between its ends.

* * * * *